United States Patent

Breckenridge

[15] 3,642,025
[45] Feb. 15, 1972

[54] OIL CONTROL SAFETY FLOAT WITH MAGNETIC LATCH

[72] Inventor: Frank Breckenridge, Glenview, Ill.

[73] Assignee: Controls Company of America, Melrose Park, Ill.

[22] Filed: July 13, 1970

[21] Appl. No.: 54,369

[52] U.S. Cl............................................................137/400
[51] Int. Cl.......................................................F16k 21/18
[58] Field of Search..................................137/400, 405, 416

[56] References Cited

UNITED STATES PATENTS

| | | | |
|---|---|---|---|
| 2,592,913 | 4/1952 | Landon | 137/400 X |
| 2,608,206 | 8/1952 | Ritter | 137/400 |
| 2,592,327 | 4/1952 | Pawelsky et al. | 137/400 X |

*Primary Examiner*—Henry T. Klinksiek
*Assistant Examiner*—David R. Matthews
*Attorney*—John W. Michael, Gerrit D. Foster, Bayard H. Michael, Paul R. Puerner, Joseph A. Gemignani, Andrew O. Riteris and Spencer B. Michael

[57] ABSTRACT

Oil flow is regulated by the main float operating the inlet valve to maintain a constant level in the float chamber. Flow from the float chamber is metered by a selected metering orifice in the rotatable disc actuated by the knob. A detent arrangement assures registry of the proper orifice. The small safety float is mounted on the same pivot as the main float and normally moves with the main float but if the inlet valve should leak, causing the oil level in the float chamber to continue to rise to an abnormally high level, the safety float will rise until the ferrous part of the float support bracket comes into the field of the permanent magnet carried by the cover. At this time the float will be lifted with a snap action and the tab standing up from the safety float bracket will strike the arm standing up from the main float bracket. This will deliver a blow to the inlet valve and will maintain the added force on the inlet valve. The control cannot subsequently be placed into operation without first manually depressing the reset button to push the safety float away from the permanent magnet.

3 Claims, 2 Drawing Figures

Inventor
Frank Breckenridge
By Bayard H. Michael
Attorney

OIL CONTROL SAFETY FLOAT WITH MAGNETIC LATCH

CROSS REFERENCES TO RELATED APPLICATIONS

The metering arrangement partly disclosed herein is fully disclosed and claimed in the copending application of Harry L. Giwosky, Ser. No. 52,603 filed July 6, 1970, assigned to applicants's assignee.

BACKGROUND OF INVENTION

Oil control valves of this general type are customarily provided with a safety device responsive to an abnormally high oil level to exert additional closing force on the inlet valve. It is generally agreed that the device should require manual resetting so that the user realizes that the control may be defective. The safety devices have been somewhat complicated and costly.

SUMMARY OF INVENTION

The construction described in the ABSTRACT provides a two-float system in which the safety float has no effect on the inlet valve operation or the force applied thereto until the designed trip level has been reached, at which time the permanent magnet pulls the safety float against the magnetic keeper and the bracket strikes the main float bracket to deliver a blow in the valve closing direction and to add its buoyancy force to the buoyancy of the main float applied to the valve. If the oil level now subsides, the safety float is retained by the magnet with sufficient force to prevent the inlet valve from opening even if the float chamber is substantially drained. The safety float must be pushed off of the magnet by means of the reset to place the control back in operation. The control is extremely simple and low in cost while assuming reliable operation of the safety.

DESCRIPTION OF PREFERRED EMBODIMENT

Figure 1:
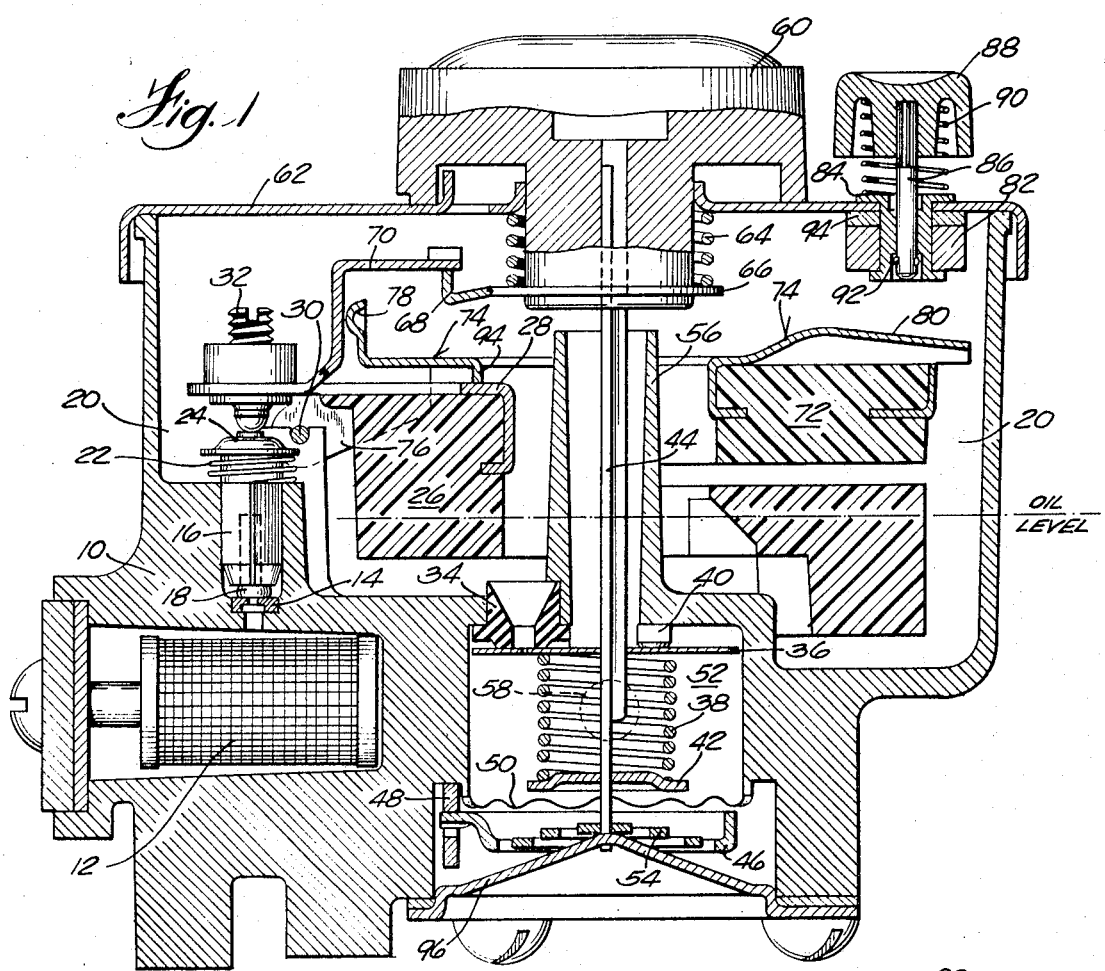
FIG. 1 is a vertical section through the control showing the two floats and the magnetic safety arrangement.
Figure 2:
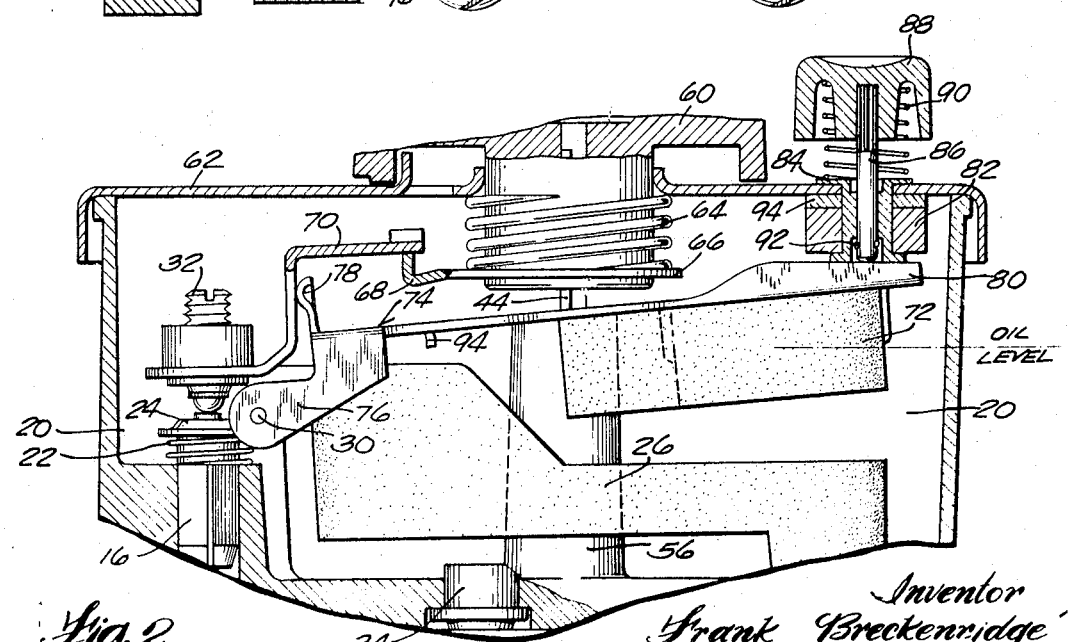
FIG. 2 is a fragmentary view similar to FIG. 1 showing the safety float in its operative position retained against the magnet.

Oil flows into control body 10 through an inlet and strainer 12 to valve seat 14. Valve 16 is provided with a soft tip 18 which cooperates with the seat 14 to regulate flow past the square valve body into float chamber 20. The valve is urged in the opening direction by compressed spring 22 acting against spring seat 24 fixed on the upper end of valve 16. Main float 26 is carried on a bracket 28 pivoted on pin 30. As the float rises the adjustable valve actuator 32 will act on the top of valve 16 in the valve closing direction. The main float is designed to maintain a normal oil level as indicated on the drawing.

Oil flows from chamber 20 through the plastic outlet fitting 34 and is metered by a suitable orifice located in metering disc 36 which is biased by spring 38 against fitting 34 and two bosses 40 (only one is shown). The spring 38 seats on plate 42 fixed on actuator shaft 44. It will be understood that a plurality of orifices are provided in the disc 36 and a desired one of these orifices can be rotated into position concentric with the outlet fitting 34. Registration of the desired orifice is assured by means of a detent action obtained through the rotating carrier 46 fixed on the lower end of shaft 44 and carrying three wheels 48 which ride on the undulating surface 50 cast in the lower portion of cavity 52 so as to assure registration of the orifices and preclude "parking" the disc between positions of proper orientation. The carrier 46 is urged upwardly resiliently by the spring arrangement 54. The details of the metering disc and detent arrangement form no part of this invention and are claimed in the Giwosky application referred to above.

Shaft 44 extends upwardly through the weir 56 which acts to vent air from chamber 52 and serves as the ultimate safety arrangement. Should the safety mechanism (described hereinafter) fail to operate and allow the oil level to reach the top of the weir the oil will flow down to cavity 52 and through the outlet 58 to the burner.

The upper end of shaft 44 is connected to knob 60 which is urged downwardly against cover 62 by compressed spring 64 acting on plate 66 rockably fixed on shaft 44. In the "off" position of the knob finger 68 projecting from plate 66 rides under the end of the arm 70 projecting from main float bracket 28. This imposes a valve closing force on bracket 28 and valve 16.

If the main float 26 has acted to close the inlet valve 16 or if the knob has been turned to the "off" position to exert a closing force on valve 16, the oil level should not rise but if a particle of dirt has lodged on the valve seat, it is possible that leakage may occur and the oil level will continue to rise. Under these conditions the rising oil level will, of course, submerge more and more of the main float 26 and increase the force acting on the inlet valve which may be sufficient to effect a good seal at the inlet. If it does not, however, safety float 72 will start to rise. Float 72 is carried on bracket 74 which is of ferromagnetic material and is provided with downturned tabs 76 pivoted on the pin 30 which also supports the main float. The adjustable tab 78 upstanding from the safety float bracket is bent so that it will not contact arm 70 projecting upwardly from the main float bracket until such time as the safety float has risen to allow the portion 80 of bracket 74 to come into the magnetic field of permanent magnet 82 supported on the underside of cover 62 by means of hollow rivet 84 through the center of which passes a reset pin 86 fixed in reset knot 88 which is biased upwardly by spring 90 and prevented from rising too far by snap ring 92 on the lower end of the reset pin. Washer 94 is positioned between the magnet and the cover. When the field of magnet 82 influences the ferrous bracket 74, the bracket is pulled against the magnet assembly with a snap action and, at the same time, tab 78 strikes arm 70 of the main float bracket. The magnetic force is delivered with considerable mechanical advantage to the inlet valve with a hammer blow effect. This, hopefully, will seat the valve. The force of the magnet will continue to be applied to the inlet valve along with the buoyancy of the safety float 72. The magnetic force exerted on the safety float bracket 74 is sufficient to prevent release of the safety float even if the oil level in chamber 20 drops to the top of outlet fitting 34. The valve cannot open. To release the safety mechanism and restore the control to operation, it is necessary to depress the reset button 88 so pin 86 will push bracket 74 out of the magnetic field. In normal operation it will be noted that the safety float is held in its position shown in FIG. 1 relative to the main float 26 by the tab 95 depending from the safety float bracket and resting on main float bracket 28. Therefore, in normal operation the safety float rises and falls with the main float.

Tab 78 must be adjusted so that it does not contact arm 70 until the magnetic field pulls in the safety float bracket. If it were to contact arm 70 prior to this time, further rise of the safety float would be prevented since the main bracket has already moved to its valve closed position and no further appreciable motion is available to the main float bracket. This control is unique in that there is provision for delivery of a hammer blow to the inlet valve, which is a very desirable feature, while not requiring the safety float to work against any appreciable friction loads prior to obtaining this hammer blow.

I claim:
1. A constant level oil control comprising,
   a housing having a chamber therein with an inlet thereto and an outlet therefrom,
   an inlet valve for regulating flow through the inlet,
   means metering flow from the outlet,
   a main float including a bracket pivoted in the chamber and operatively connected to the inlet valve to control the valve to maintain a constant level in the chamber, a safety float including a bracket mounted on the same pivot as the main float and normally resting on and supported by the main float, said safety float being operative to float and lift off of the main float in response to an abnormally high oil level in said chamber, a magnet positioned above the safety float, said bracket including ferrous material which moves into the field of the magnet when the level in the chamber reaches a predetermined high level whereby the safety float is pulled upwardly with a snap action, the safety float bracket being adjusted to impact on the main float bracket when the safety float is lifted by the magnet and thereby deliver an impact to the inlet valve in the valve closing direction, said magnet being sufficiently strong to retain the ferrous bracket even when the oil level recedes in the chamber, means for pushing the bracket off of the magnet to restore the safety valve to normal operation, said safety float acting on the bracket system in such a way as to prevent normal operation of the main float so long as the safety float is held against the magnet.

2. The control according to claim 1 in which the main bracket has an upstanding arm and the safety float bracket has a tab which engages the arm when the safety float starts to move by reason of the pull of the magnetic field, said tab and arm being separated in all other conditions whereby the safety float does not affect the main float operation other than being supported thereby.

3. The control according to claim 2 including a knob for regulating the metering means, and means operated by the knob to engage said arm to act thereon to move the main bracket in the valve closing direction when the knob is turned to its "off" position.

* * * * *